US009192041B2

(12) United States Patent
Cho et al.

(10) Patent No.: US 9,192,041 B2
(45) Date of Patent: Nov. 17, 2015

(54) PLASMA TORCH NOZZLE

(71) Applicant: KOREA HYDRO & NUCLEAR POWER CO., LTD., Gyeongsangbuk-do (KR)

(72) Inventors: Hyun Je Cho, Daejeon (KR); Cheon Woo Kim, Daejeon (KR); Young Il Kim, Daejeon (KR); Sang Woo Lee, Daejeon (KR); Seung Chul Park, Daejeon (KR); Jong Gil Park, Gyeonggi-do (KR); Tae Won Hwang, Daejeon (KR)

(73) Assignee: Korea Hydro & Nuclear Power Co., Ltd., Gyeongsangbuk-do (KR)

( * ) Notice: Subject to any disclaimer, the term of this patent is extended or adjusted under 35 U.S.C. 154(b) by 91 days.

(21) Appl. No.: 14/132,566

(22) Filed: Dec. 18, 2013

(65) Prior Publication Data

US 2015/0102019 A1 Apr. 16, 2015

(30) Foreign Application Priority Data

Oct. 10, 2013 (KR) ........................ 10-2013-0120401

(51) Int. Cl.
*B23K 10/00* (2006.01)
*H05H 1/34* (2006.01)

(52) U.S. Cl.
CPC ......... *H05H 1/34* (2013.01); *H05H 2001/3478* (2013.01)

(58) Field of Classification Search
CPC .............. H05H 1/34; H05H 1/26; H05H 1/48
USPC ......... 219/121.5, 121.52, 121.48, 75, 121.36; 373/18, 19, 22, 54, 55
See application file for complete search history.

(56) References Cited

U.S. PATENT DOCUMENTS 3,007,072 A * 10/1961 McGinn et al. .......... 313/231.51
3,210,586 A * 10/1965 Clevett, Jr. .................... 313/146
3,673,375 A * 6/1972 Camacho ................ 219/121.36
3,953,705 A 4/1976 Painter
4,801,435 A * 1/1989 Tylko ....................... 422/186.04
5,939,151 A * 8/1999 Prichard et al. ............... 427/576

FOREIGN PATENT DOCUMENTS

JP 1990-121300 A 5/1990
JP 1991-070864 U 7/1991

* cited by examiner

*Primary Examiner* — Mark Paschall
(74) *Attorney, Agent, or Firm* — Rabin & Berdo, P.C.

(57) ABSTRACT

The present invention is to solve the problems described above and to provide the plasma torch nozzle of graphite material coupled to the front electrode of the plasma torch by bolts.
To achieve the object of the invention, the plasma torch nozzle according to this invention is characterized by that the torch nozzle is fixedly coupled to the front electrode of the plasma torch by one or more bolts.

1 Claim, 3 Drawing Sheets

PLASMA TORCH NOZZLE

TECHNICAL FIELD

The present invention is directed to a plasma torch nozzle, especially, the plasma torch nozzle of graphite material fixedly attached to a front electrode of a plasma torch.

BACKGROUND ART

Thermal plasma is generally used for disposal of wastes, development of new material, elimination of noxious gases, etc.

The core technology in thermal plasma relates to plasma torch generating ultra high temperature of plasma. Among the plasma torches, DC (direct current) arc plasma torch of hollow type is most widely used.

The plasma torch of hollow type has electrode generating DC arc inside. The electrode has a particularly designed inner space of which the front side and the rear side have a front electrode 2 and a rear electrode 3, respectively, to confine ultra high temperature of plasma that is conductive fluid and to give necessary properties. The inner space is connected to the electric discharge electrode of the torch nozzle and serves as guide to finally discharge the plasma focused on a fluid arc spot to the outside.

Particularly, the electrode and electrode nozzle of the plasma torch are made of OPC (oxygen free copper) material for easy arc ignition.

However, since the front electrode and electrode nozzle of OPC material are places on which DC arc spot is focused, they are fast eroded due to high temperature of arc heat.

Still in the case of torch of reverse polarity type, the erosion in the cathode spot is larger than in the anode spot.

And in a melting furnace system using the plasma torch, the torch electric discharge electrode of OPC material is inserted into the melting furnace for operation and thus is exposed to high temperature of plasma atmosphere.

Therefore water cooling is necessarily required to lower the rate of erosion in the front part of the torch and this deteriorates heat efficiency of the plasma torch.

Also a behavior of plasma in the melting furnace is less reproducible and always has large uncertainty. The torch nozzle exposed to this situation is easily damaged in the cooling channel even by small side arcing.

In this case, the operation is stopped and the nozzle must be replaced with new one. This will lower the efficiency of operation.

Further, since the price of OPC is expensive and the nozzle is also very expensive because of difficult processing process of it, it is generally uneconomical.

The electrode nozzle of OPC material in conventional plasma torch is very expensive in its price and causes side arcing. Thus it has problems of short life cycle, low operating efficiency and economical infeasibility.

DISCLOSURE

Technical Problem

The present invention is to solve the problems described above and to provide the plasma torch nozzle of graphite material coupled to the front electrode of the plasma torch by bolts.

Technical Solution

To achieve the object of the invention, the plasma torch nozzle according to this invention is characterized by that the torch nozzle is fixedly coupled to the front electrode of the plasma torch by one or more bolts 11.

Advantageous Effects

As described above, the plasma torch nozzle according to this invention has the effects as follows:

First, since the plasma torch nozzle of this invention does not need a cooling channel and can be periodically replaceable after use for a given period, the heat efficiency, stable operation, facilities utilization rate, economical feasibility in operation, etc. of the plasma torch can be improved.

Second, since the nozzle of consumable graphite material in this invention can be periodically replaceable after use for short period without further cooling, the plasma torch of this invention can be available at low cost, resulting in enhancement of global competitiveness.

BEST MODE

Figure 1:
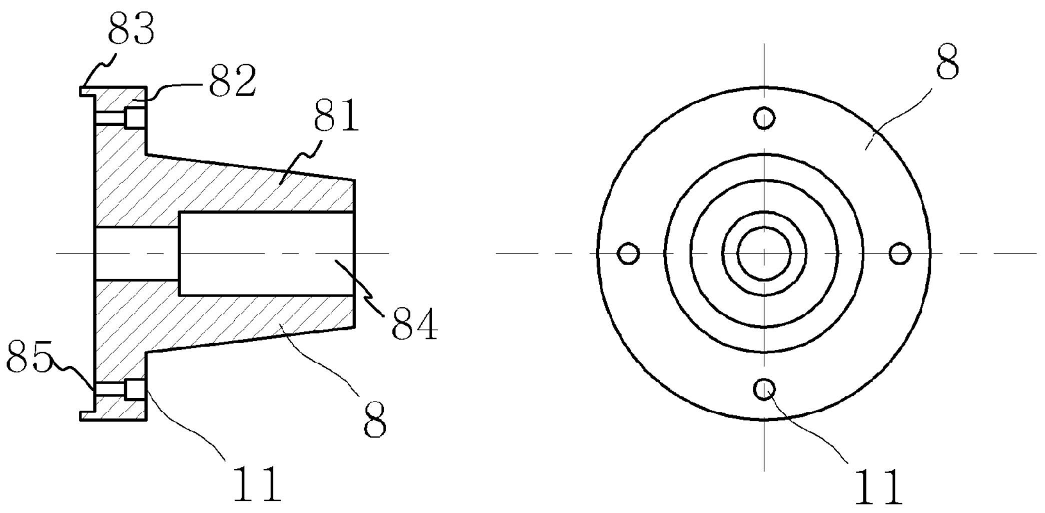
FIG. 1 shows a schematic diagram of the plasma torch nozzle according to this invention.

Hereinafter, the present invention will now be described in detail with reference to the drawing.

FIG. 1 shows a schematic diagram of the plasma torch nozzle according to this invention. As shown in the drawing, the plasma torch nozzle 8 includes a body 81 having a tapered shape with a first end and a second end, wherein the first end has a greater diameter than that of the second end, and the second end is disposed far from the front electrode 1 when it is coupled to the front electrode 1. Also, the plasma torch nozzle 8 includes a flange 82 formed in a lateral side of the body 81 along the first end of the body 81, and a rim 83 formed along and protruding from an outer edge of the flange 82 of which an inner surface is engaged with an outer surface of an end of a plasma torch housing 4. A nozzle hole 84 is formed inside the body 81 along a center axis thereof and has a first part being open at the first end of the body and a second part being open at the second end of the body, wherein the second part has a greater diameter than that of the first part. The plasma torch nozzle 8 includes at least one bolt hole 85 formed in the flange 82, and at least one bolt 11 inserted into the bolt hole 85 to couple the plasma torch nozzle 8 to the plasma torch housing 4. Thus, the plasma torch nozzle 8 according to this invention is fixedly coupled to the plasma torch front electrode 1 of the plasma torch by one or more bolts 11. The torch nozzle is made of graphite.

The plasma torch nozzle 8 according to this invention is a part extended from the plasma torch front electrode 1 of the plasma torch, thus a member on which an arc spot is focused when plasma is generated.

The plasma torch front electrode 1 and torch nozzle 8 confine plasma which is high temperature of fluid and serve to give desired properties.

Especially, the plasma torch nozzle 8 according to this invention is structurally coupled to the plasma torch front electrode 1 in the plasma torch by bolts.

Since the plasma torch nozzle 8 is made of graphite material, it can be consumptively used. The outside is exposed to high temperature of plasma and the inside is gradually eroded by high temperature of arc spot. Therefore, when the erosion proceeded by a certain degree of amount, the plasma torch nozzle 8 can be replaced with a new one, by loosening the bolts.

Figure 2:
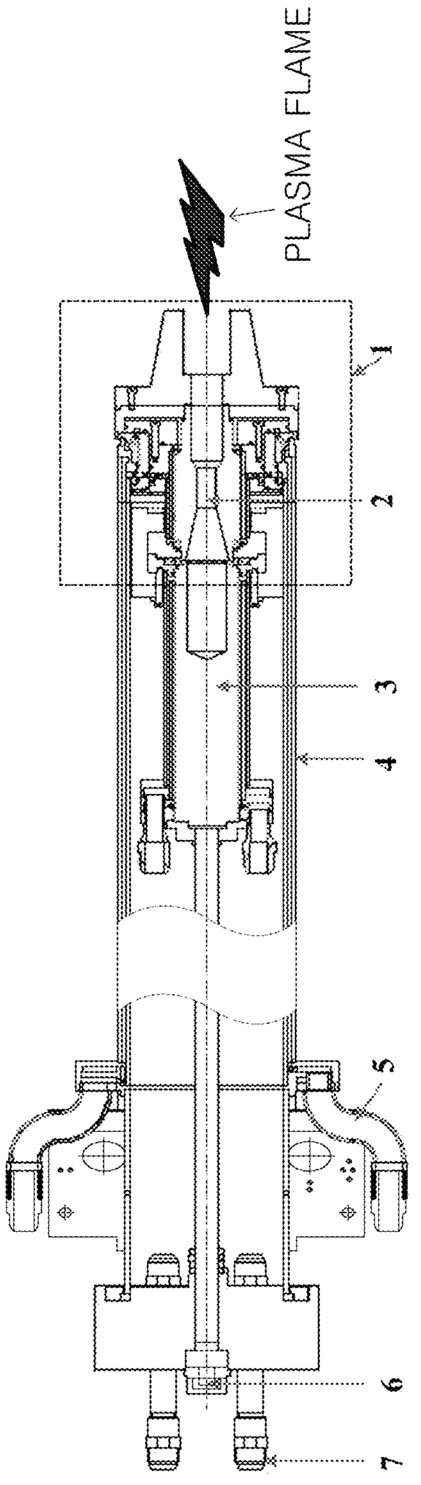
FIG. 2 shows a schematic diagram of the plasma torch with the plasma torch nozzle applied according to this invention.
Figure 3:
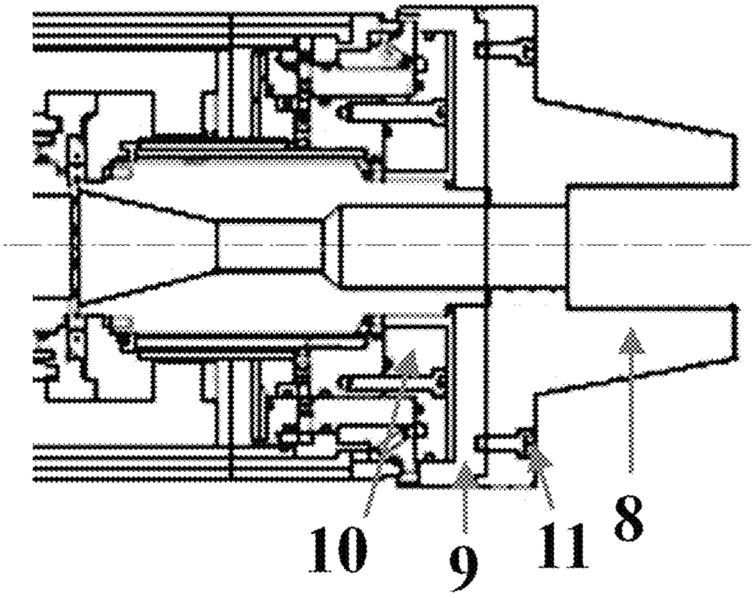
FIG. 3 shows schematically the plasma torch front electrode of FIG. 2

FIG. 2 shows a schematic diagram of the plasma torch with the plasma torch nozzle applied according to this invention. FIG. 3 shows schematically the plasma torch front electrode of FIG. 2.

As shown in the drawings, the plasma torch nozzle 8 according to this invention is a part extended from the plasma torch front electrode 1 of the plasma torch, thus a member on which an arc spot is focused when plasma is generated.

The plasma torch front electrode 1 and torch nozzle 8 confine plasma which is high temperature of fluid and serve to give desired properties.

Especially, the plasma torch nozzle 8 according to this invention is structurally coupled to the plasma torch front electrode 1 in the plasma torch by bolts.

On operating in the atmosphere of high temperature of plasma, since the plasma torch front electrode 1 is inserted into a melting furnace (or reacting furnace), the whole part of it is exposed to high temperature of arc.

Also since the plasma torch housing 4 is electrically isolated and cooling water is circulated inside the housing, the outside surface is prevented from damaging even in the high temperature of plasma.

As shown in FIG. 2, the plasma torch includes an electrode cooling water coupling part 5, a DC power supply connection part 6, and a plasma gas coupling part 7. Also, as shown in FIG. 3, the plasma torch further includes plasma nozzle facilities 9 and 10.

What is claimed is:

1. A plasma torch nozzle for use in a plasma torch having a front electrode, comprising:

a body having a tapered shape with a first end and a second end, the first end having a greater diameter than that of the second end, the second end being disposed far from the front electrode when coupled to the front electrode;

a flange formed on a lateral side of the body along the first end of the body;

a rim formed along and protruding from an outer edge of the flange, the rim being engaged with an outer surface of an end of a plasma torch housing;

a nozzle hole formed inside the body along a center axis thereof and having a first part being open at the first end of the body and a second part being open at the second end of the body, the second part having a greater diameter than that of the first part;

at least one bolt hole formed in the flange, at least one bolt inserted into the bolt hole and coupling the plasma torch nozzle to the front electrode, wherein the plasma torch nozzle is made of graphite.

* * * * *